United States Patent
Krolak et al.

(10) Patent No.: US 8,972,765 B1
(45) Date of Patent: Mar. 3, 2015

(54) ELECTRICAL ENERGY MANAGEMENT METHOD AND APPARATUS FOR MULTIPLE DISTRIBUTION BUSES AND BATTERIES

(75) Inventors: Matthew Joseph Krolak, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 13/439,752

(22) Filed: Apr. 4, 2012

(51) Int. Cl.
*G06F 1/26* (2006.01)
*H02J 7/00* (2006.01)

(52) U.S. Cl.
CPC .................. *H02J 7/0029* (2013.01)
USPC ............ 713/340; 713/310; 320/149; 320/161

(58) Field of Classification Search
USPC ............ 713/300, 310, 340; 320/149, 161
See application file for complete search history.

(56) References Cited

U.S. PATENT DOCUMENTS

| | | | |
|---|---|---|---|
| 6,901,520 B2 * | 5/2005 | Odaohhara et al. | 713/300 |
| 7,465,507 B2 | 12/2008 | DeVries | |
| 7,745,025 B2 | 6/2010 | Leach et al. | |
| 7,847,432 B2 * | 12/2010 | Ichikawa | 307/45 |
| 2012/0212176 A1 * | 8/2012 | Park | 320/107 |
| 2013/0082664 A1 * | 4/2013 | Hiraoka et al. | 320/149 |

* cited by examiner

*Primary Examiner* — Thuan Du
(74) *Attorney, Agent, or Firm* — Hope Baldauff, LLC

(57) ABSTRACT

The present disclosure is directed to a system including a power source connected to at least two electrical buses, and a battery connected to each one of the electrical buses. Each battery is charged by the power source and is connected to a load via one of the electrical buses. A battery error signal generator generates a battery error signal for each battery by finding a difference between a sensed battery voltage and a reference voltage. A reference control signal generator generates a reference control signal for each battery based on the battery error signals for each battery. A power sensor produces a sensed power signal between the power source and each battery connected to each of the two electrical buses. The reference control signal and the sensed power signal for each battery controls a power output value from the power source to each battery.

20 Claims, 3 Drawing Sheets

ELECTRICAL ENERGY MANAGEMENT METHOD AND APPARATUS FOR MULTIPLE DISTRIBUTION BUSES AND BATTERIES

STATEMENT OF RIGHTS OWNED

The invention was made with Government support awarded by the Department of Defense. The government has certain rights in this invention.

TECHNICAL FIELD

The following disclosure relates generally to dynamically allocating power from a single power source to multiple batteries via independent buses, and specifically, optimally charging the multiple batteries via independent buses, protecting them from over and under charged conditions, protecting the single power source from fast transients and over current conditions, and allocating power between two or more independent distribution buses and their connected batteries.

BACKGROUND

Electrically powered vehicles contain multiple independent electrical buses with separate batteries connected to loads on each bus. The buses supplied from a single fuel cell are not able to supply sufficient power for peak loads, nor can they respond quickly to load transients without suffering potential damage or degraded performance. The problem exists for fairly allocating limited electrical power generation capability between several independent electrical buses with independent loads and energy storage elements, such as batteries, without switching a power source to charge single batteries at a time.

Current solutions to this problem use only one electrical bus or only one battery where there is no possibility of the requested power exceeding generation capacity, and to distribute power via switching between electrical buses to different locations (buses) downstream of the energy storage element. Another solution is to use batteries as the primary energy source with no independent power generation or battery charging capability. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a system includes a power source, at least two electrical buses connected to the power source, and a battery connected to each one of the at least two electrical buses, each battery being charged by the power source, and each battery being connected to a load via one of the at least two electrical buses. A battery error signal generator for generating a battery error signal for each battery by finding a difference between a sensed battery voltage and a reference voltage. A reference control signal generator generates a reference control signal for each battery based on the battery error signals for each battery. A power sensor produces a sensed power signal between the power source and each battery connected to each of the two electrical buses. The reference control signal and the sensed power signal for each battery controls a power output value from the power source to each battery connected to each one of at least two electrical buses.

In another embodiment disclosed herein, a method is provided for simultaneously distributing electrical power to at least two batteries connected on independent electrical buses to a central power source. The method includes determining a sensed battery voltage value for each battery and determining a battery error signal for each battery based on the difference between the sensed battery voltage value and a reference voltage value. A proportional battery power signal is determined for each battery based on the sensed battery voltage value for each battery and a sensed battery current value for each battery, and a reference control signal is generated for each battery based on a sensed power signal between the power source and each battery and one of the battery error signals for each battery and the proportional battery power signals for each battery. The power output from the power source to each battery is controlled based on the reference control signal for each battery.

In another embodiment disclosed herein, a method includes measuring each battery voltage of a plurality of batteries connected to a single power source via independent electrical buses, and measuring each battery current of the plurality of batteries. A battery error signal is generated for each battery of the plurality of batteries by the determining a difference between each battery voltage value and a reference voltage value. If the sum of all battery error signals for the plurality of batteries is greater than a maximum power value of a power source used to charge the plurality of batteries, then a reference control signal is generated for each battery of the plurality of batteries based on determining if the sum of all battery error signals for the plurality of batteries is greater than a maximum power value of a power source used to charge the plurality of batteries. The power output is controlled from the power source to each battery of the plurality of batteries based on the reference control signal.

The embodiments disclosed herein dynamically allocate power to multiple batteries and their buses from a single power source, whereas other identified solutions charge only one battery or lack the ability to recharge onboard batteries entirely. The embodiments disclosed herein allow greater system redundancy and reliability through fault isolation and multiple energy storage elements. A fault or battery failure on one bus can be easily isolated from the other, and minimum additional components can allow loads and batteries to be connected or disconnected in various configurations to route around faults.

The features, functions, and advantages that have been discussed can be achieved independently in various embodiments of the present disclosure or may be combined in yet other embodiments, further details of which can be seen with reference to the following description and drawings.

DETAILED DESCRIPTION

The following disclosure describes a system and method for dynamically allocating power to multiple batteries via their respective buses from a single power source.

Electrically powered vehicles often contain at least two independent electrical buses with separate batteries on each bus. These buses are supplied from a single power source, such as a fuel cell, which will not alone supply sufficient power for peak loads, nor will it respond quickly to load transients without suffering potential damage or having a degraded performance. However, the embodiments disclosed below include multiple batteries connected to a load to serve as an energy buffer which supplies peak power to the loads when the power source is insufficient to do so, and to prevent load transients from propagating to the fuel cell. Each battery includes a control loop which controls battery recharging and generates a reference control signal configured to direct up to full power source generation capability to each respective electrical bus. This creates the potential for the total requested power source power generation to exceed the power source's capabilities, (where each control loop may request full power and the combined request equals twice the power source's full generation capability). As a result, the embodiments presented herein are employed to fairly allocate power to each of the distributions buses and batteries based on criteria or priority while the power source is operational. This configuration offers protection to the power source as well as the distribution buses and batteries from over or under charging.

Figure 1:
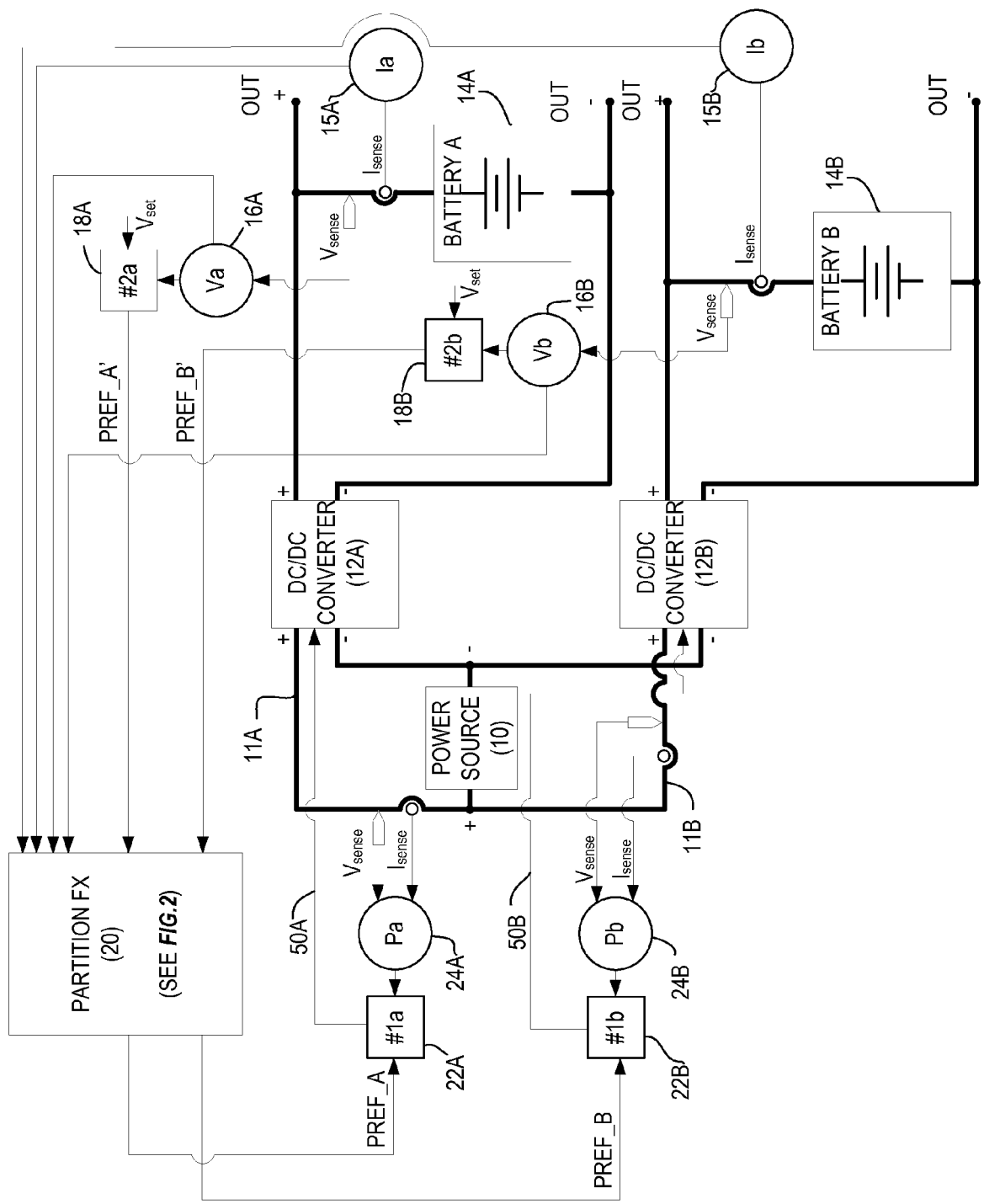
FIG. 1 is a schematic diagram in accordance with an embodiment disclosed herein.

FIG. 1 is a schematic diagram illustrating a system configured to include a power source 10. The power source 10 may comprise a fuel cell or any other electrical power generation device. The power source in FIG. 1 is connected to two independent electrical buses, 11A and 11B, used to charge batteries 14A and 14B, respectively. Although only two buses are shown for simplification purposes, many more buses may be incorporated into this embodiment. However, it is important for each electrical bus be discretely connected to a battery for charging and supplying power to an associated load. A DC to DC converter 12A and 12B is connected between the power source 10 and each battery 14A and 14B via each the electrical bus 11A and 11B. The DC to DC converters 12A and 12B allow for each electrical bus 11A and 11B to be controlled by a converter control signal (50A and 50B, described below) to regulate an independent voltage level output requirement which may be different from the power supplied by the power source 10. A load or loads (not shown) may be applied to the output of each electrical bus 11A and 11B to receive power from the respective batteries 14A and 14B and/or power from the power source 10.

The processing of generating the converter control signals 50A and 50B configured to control each DC to DC converter 12A and 12B on the electrical buses 11A and 11B will now be described. Current sensors Ia at 15A and Ib at 15A measure a current value for each battery A at 14A and B at 14B, respectively. Voltage sensors Va at 16A and Vb at 16B measure a voltage value for each battery 14A and 14B, respectively. Additionally, proportional-integral-derivative controllers (PID controllers) #2b at 18B and #2a at 18A take the measured voltage for each battery from the voltage sensors 16A and 16B with a reference voltage Vref to output a battery error signal PREF_A' for battery A at 14A, and a battery error signal PREF_B' for battery B at 14B. The PID controllers are a generic control loop feedback mechanism configured to calculate an "error" value output as the difference between a measured process variable, here the realtime voltage measurement, and a desired setpoint, Vref. All three sets of these signals, from the current sensors 15A and 15B, the voltage sensors 16A and 16B and the PID controllers 18A and 18B are feed into the block in FIG. 1 denoted as Partition FX 20. The Partition FX 20 is described further in detail in FIG. 2.

Each of the above-identified signals feed into the Partition FX 20 are used to output a reference control signals PREF_A and PREF_B with respect to each battery. In this case, with two batteries 14A and 14B, two reference control signals PREF_A and PREF_B are output and used to provide a converter control signal 50A and 50B to the DC to DC converters 12A and 12B, respectively, for each battery's electrical bus. The two output reference control signals PREF_A and PREF_B are feed into respective PID controllers #1a at 22A and #1b at 22B along with a sensed power signal supplied by power sensors Pa at 24A and Pb at 24B configured to sense a power output from the power source 10 on both electrical buses 11A and 11B before the DC to DC converters 12A and 12B, respectively. Each PID controller 22A and 22B outputs a converter control signal 50A and 50B, respectively, which control DC to DC converters 12A and 12B, respectively.

In summary, a power source 10 is connected to at least two electrical buses 11A and 11B. Batteries 14A and 14B are connected to each one of the at least two electrical buses 11A and 11B, where each battery 14A and 14B are charged by the power source 10, and are connected to a load, (not shown, between Out+ and Out−), via one of the at least two electrical buses 11A and 11B. A battery error signal generator 18A and 18B generates a battery error signal PREF_A' and PREF_B' for each battery 14A and 14B by finding a difference between a sensed battery voltage and a reference voltage Vref. A reference control signal generator 20 generates a reference control signal PREF_A and PREF_B for each battery based on the battery error signals PREF_A' and PREF_B' for each battery 14A and 14B. Power sensors 24A and 24B produces a sensed power signal between the power source 10 and each battery 14A and 14B connected to each one of the at least two electrical buses 11A and 11B. The reference control signal for each battery PREF_A and PREF_B and the sensed power signal for each battery produce a converter control signal 50A and 50B to control a power output value from the power source 10 to each battery 14A and 14B on their respective electrical buses 11A and 11B, by controlling each DC to DC converter 12A and 12B, respectively.

Figure 2:
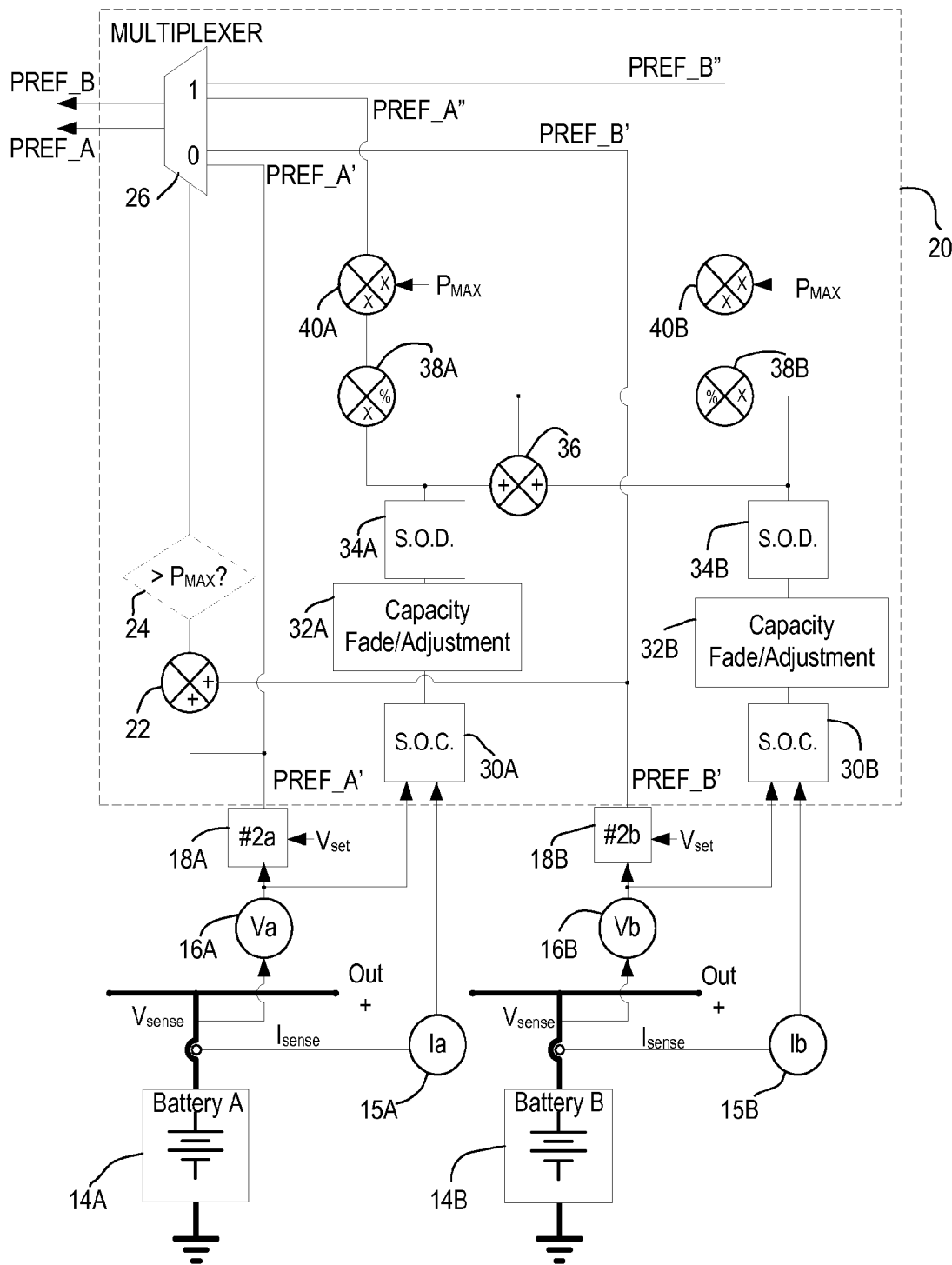
FIG. 2 is a schematic diagram of further detailing the Partition FX 20 of FIG. 1.

FIG. 2 is a schematic diagram further detailing the logic and signal flow through Partition FX (reference control signal generator) 20 of FIG. 1 configured to generate the reference control signals PREF_A and PREF_B used to control the DC to DC converters for each battery's electrical bus. As previously disclosed above, all three sets of signals, from the current sensors 15A and 15B, the voltage sensors 16A and 16B and the PID controllers 18A and 18B are feed into the block into Partition FX 20.

The first determination made is whether the sum of the battery error signals PREF_A' and PREF_B', generated by PID controllers #2a at 18A and #2b at 18B, are greater than the maximum power (Pmax) from the power source 10. Both battery error signals PREF_A' and PREF_B' are added at 22 and then compared to the maximum power value Pmax 24 of the power source 10.

If the sum of the battery error signals PREF_A' and PREF_B' is less than Pmax, then the battery error signals are passed through multiplexer 26 and each battery error signal value is output as the reference control signal PREF_A and PREF_B, respectively. Alternately stated, when PREF_A'+ PREF_B'>Pmax, then PREF_A=PREF_A' and PREF_B=PREF_B'. Thus, the battery errors signals PREF_A' and PREF_B' are passed through to the inner control loops as shown in FIG. 1.

If the sum of the battery error signals PREF_A' and PREF_B' is greater than Pmax, then a proportional battery power signal needs to be determined based on the sensed voltage and current signals. The battery terminal voltage Va and Vb and current Ia and Ib of each battery are monitored and used to calculate the State of Charge (S.O.C.) of each battery. In this instance, the sensed current values Ia and Ib from current sensors 15A and 15B, and the sensed battery terminal voltage values Va and Vb from voltage sensors 16A and 16B are feed into S.O.C. calculators, 30A and 30B, respectively.

The State of Charge estimation may be accomplished in many different methods. The following is one example where only Ia and Ib are required to calculate the State of Charge for each battery 14A and 14B:

$$S.O.C. = \frac{\left(\text{Capacity} - \int_{t_1}^{t_2} I_{Battery}(t)\,dt\right)}{\text{Capacity}}$$

where Capacity is the amount of charge stored in a fully charged battery. (Battery terminal voltage values Va and Vb are not required for this particular method, but may be required for alternative and more sophisticated methods not disclosed herein.)

The S.O.C. is then adjusted at 32A and 32B to produce an adjusted S.O.C. value including a capacity fade value calculated as:

$$S.O.C.\text{ Adjusted} = \text{Capacity}_0\left(1 - \frac{\int_0^t I_{Battery}(t)\,dt}{C_{Current}}\right)$$

where $\text{Capacity}_0$ is the value of the total charge capacity of a new battery, and $C_{Current}$ is the capacity of the current battery less than $\text{Capacity}_0$ based on charge degradation due to battery usage. What the calculation of S.O.C.Adjusted accomplishes the allocation of more charging power to a battery which is mostly discharged. The S.O.C.Adjusted determines how much charge is in a battery compared to the maximum amount of charge the battery is able to store. As a battery ages, the amount of charge it is able to store decreases. Thus, if a S.O.C. is calculated for an old battery that is fully charged using the capacity of a new battery, the calculated S.O.C. will indicate a less than fully charged battery. In order to compensate for this, the calculated S.O.C. should be divided by the actual current battery capacity.

The S.O.C. Adjusted value is then used to calculate a State of Discharge (S.O.D.) value at 34A and 34B calculated as:

S.O.D.=1−S.O.C.Adjusted

The S.O.D. of each battery is added to compute a total S.O.D. at 36, and each battery S.O.D. is divided by the total S.O.D. at 38A and 38B to determine a per battery power ratio based on the total S.O.D. The per battery power ratio is multiplied by the maximum power Pmax 40A and 40B of the power source 10 to generate proportional battery power signals PREF_A" and PREF_B". This information is used when the sum of the power references exceed the maximum allowable power by allocating more power to the bus with the battery which is more deeply discharged. In this case, the power is allocated per battery as a fraction of the maximum allowed power equal to the S.O.D. of the battery divided by the total S.O.D. of all batteries. This ensures that as each battery discharges further, each battery is allocated a larger portion of the available power.

In summary, a method of simultaneously distributing electrical power to at least two batteries 14A and 14B connected on independent electrical buses 11A and 11B to a central power source 10, includes determining a sensed battery voltage value at 16A and 16B for each battery, and determining battery error signals PREF_A' and PREF_B' for each battery based on the difference between the sensed battery voltage value and a reference voltage value Vref. A proportional battery power signal PREF_A" and PREF_B" is determined for each battery based on the sensed battery voltage value for each battery and a sensed battery current value for each battery. A converter control signal 50A and 50B is generated for each battery based on a sensed power signal at 24A and 24B between the power source 10 and each battery 14A and 14B and the reference control signals PREF_A and PREF_B for each battery. The power output from the power source 10 is controlled to each battery based on the converter control signals for each battery.

Figure 3:
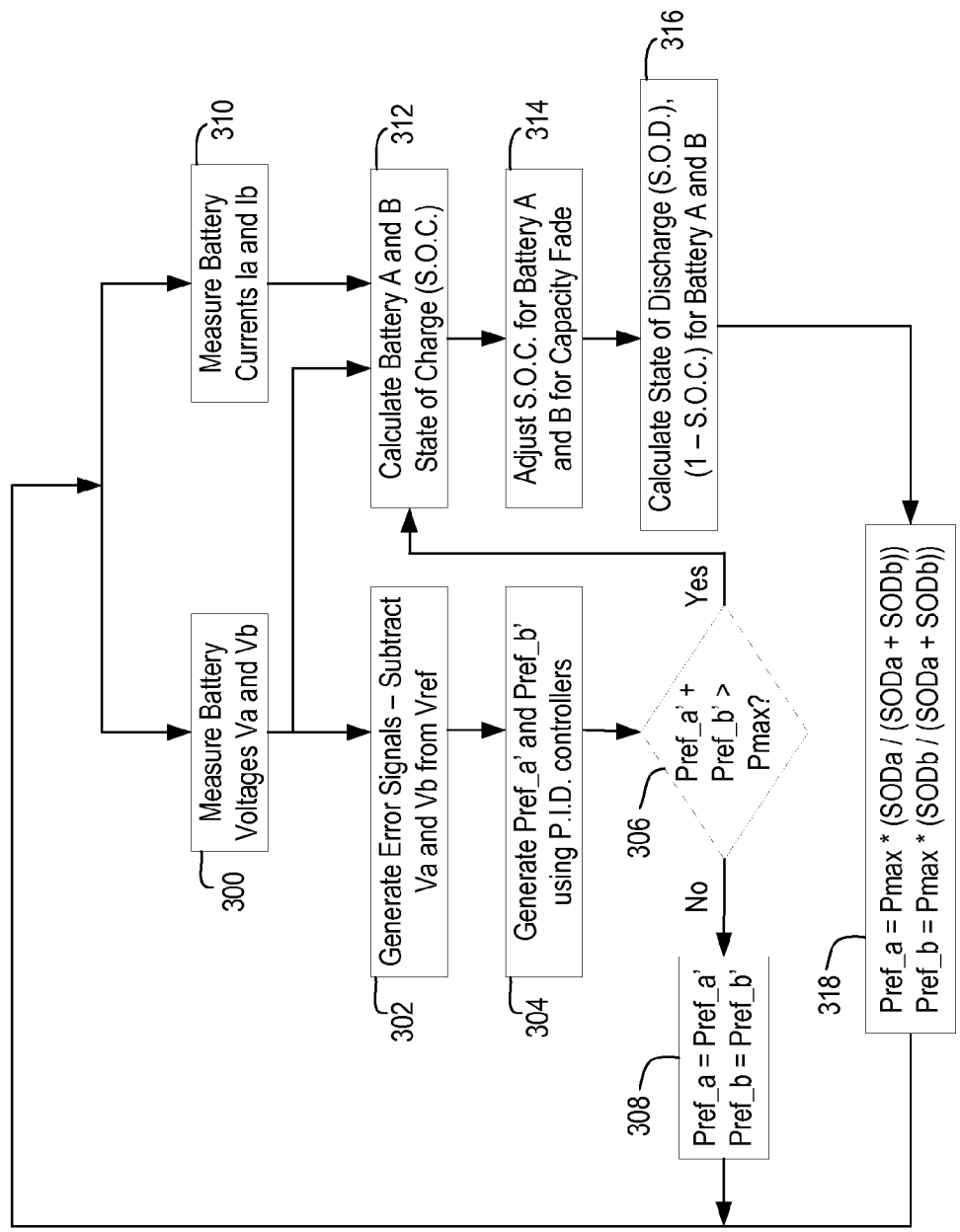
FIG. 3 is a logical flowchart process in accordance with an embodiment disclosed herein.

FIG. 3 is a logical flowchart process illustrating a method of generating a converter control signal for each electrical bus and follows the control signal paths of FIG. 2. A measurement of battery terminal voltages Va and Vb are made at 300 and battery error signals PREF_A' and PREF_B' are generated by a PID controller from the voltage values by finding the difference between each measured battery terminal voltage value Va and Vb from a reference voltage signal Vref 302 at 304. Both battery error signal values of PREF_A' and PREF_B' are added together and compared to a maximum power value Pmax 306. If the sum of battery error signal values PREF_A' and PREF_B' is less than the maximum power Pmax of the power source 100, then each battery error signal is output 308 as PREF_A and PREF_B, respectively, from the multiplexer 26.

If the sum of PREF_A' and PREF_B' is greater than the maximum power Pmax of the power source 100, the each battery current measurement Ia and Ib at 310 and each battery terminal voltage measurement Va and Vb from 300 are input into a State of Charge (S.O.C.) calculation to determine each battery's S.O.C. 312. Each battery's S.O.C. is then adjusted for a capacity fade value at 314, and t adjusted S.O.C. value for each battery is then used to calculate a State of Discharge (S.O.D.) value for each battery by subtracting the adjusted S.O.C. value from a value of one (1), 316. The output reference control signal is then determined as a per battery allocation of power as a fraction per battery of the maximum allowed power (Pmax) equal to the S.O.D. of each battery divided by the total S.O.D. of all the batteries 318.

In summary, an embodiment presented herein includes a method configured to measure each battery voltage 300 of a plurality of batteries connected to a single power source via independent electrical buses, and measures each battery current 310 of the plurality of batteries. A battery error signal is generated 302 for each battery of the plurality of batteries by the determining a difference between each battery terminal voltage value Va and Vb and a reference voltage value Vref. The sum of all battery error signals for the plurality of batteries is determined if it is greater 306 than a maximum power value of a power source used to charge the plurality of batteries. A reference control signal is generated 308/318 for each battery of the plurality of batteries based on determining if the sum of all battery error signals for the plurality of batteries is greater than a maximum power value of a power source used to charge the plurality of batteries. The power output from the power source to each battery of the plurality of batteries is then controlled based on the generated reference control signal.

Thus, the concepts described herein dynamically allocate power to multiple batteries/buses from a single power source, whereas other identified solutions charge only one battery at a time. This allows greater system redundancy and reliability through fault isolation and multiple energy storage elements. A fault or battery failure on one bus can be easily isolated from the other based on the voltage and current sensing capabilities at the batteries and minimum additional components can allow loads and batteries to be connected or disconnected in various configurations to route around faults.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A system comprising:
    a power source;
    at least two electrical buses connected to the power source;
    a battery connected to each one of the at least two electrical buses, each battery being charged by the power source, and each battery being connected to a load via one of the at least two electrical buses;
    a battery error signal generator configured to generate a battery error signal for each battery according to a difference between a sensed battery voltage and a reference voltage;
    a reference control signal generator configured to generate a reference control signal for each battery based on the battery error signals for each battery;
    a power sensor configured to produce a sensed power signal between the power source and each battery connected to each one of the at least two electrical buses; and
    a power controller operative to control a power output value from the power source to each battery connected to each one of the at least two electrical buses according to the reference control signal and the sensed power signal for each battery.

2. The system according to claim 1, wherein the power source further comprises a fuel cell.

3. The system according to claim 1, further comprises a DC/DC converter being connected to each one of the at least two electrical buses between the power source and each battery connected to the at least two electrical buses.

4. The system according to claim 3, wherein the DC/DC converter controls the power output value based on the reference control signal and the sensed power signal for each battery to regulate power output from the power source to each battery connected to the at least two electrical buses.

5. The system according to claim 1, further comprises:
    a voltage sensor configured to produce a sensed battery voltage signal of each battery connected to the load; and
    a current sensor configured to produce a sensed battery current signal of each battery connected to the load.

6. The system according to claim 5, wherein the reference control signal generator further comprises:
    a multiplexer configured to receive the sensed battery voltage signal, the sensed battery current signal and the battery error signal for each battery to produce the reference control signal for each battery.

7. The system according to claim 6, wherein the reference control signal is further generated by
    producing a proportional battery power signal for each battery by
        calculating a battery state of charge for each battery based on the sensed battery voltage signal and the sensed battery current signal;
        adjusting the battery state of charge with a battery capacity fade value for each battery; and
        calculating a battery state of discharge based on the adjusted battery state of charge for each battery; and
        producing the proportional battery power signal for each battery as a product of a maximum power value of the power source and a ratio of one battery's state of discharge over a sum of all battery's state of discharge.

8. A method of simultaneously distributing electrical power to at least two batteries connected on independent electrical buses to a central power source, the method comprising:
    determining a sensed battery voltage value for each battery;
    determining a battery error signal for each battery based on the difference between the sensed battery voltage value and a reference voltage value;
    determining a proportional battery power signal for each battery based on the sensed battery voltage value for each battery and a sensed battery current value for each battery;
    generating a reference control signal for each battery based on a sensed power signal between the power source and each battery and one of the battery error signals for each battery and the proportional battery power signals for each battery; and
    controlling the power output from the power source to each battery based on the reference control signal for each battery.

9. The method according to claim 8, further comprising:
    calculating a state of charge value for each battery based on the sensed battery voltage value for each battery and the sensed battery current value for each battery.

10. The method according to claim 9, wherein calculating the state of charge value includes measuring the sensed battery current value and integrating the sensed battery current values over time.

11. The method according to claim 9, further comprising:
    adjusting the state of charge value for a battery capacity fade value.

12. The method according to claim 11, wherein the battery capacity fade value being a product of a battery total charge capacity and a difference of 1 less the integral of the sensed battery current values over time over the current battery total charge capacity based on degradation due to battery usage.

13. The method according to claim 12, further comprising:
    calculating a state of discharge value for each battery equal to 1 less than the adjusted state of charge value.

14. The method according to claim 13, wherein the proportional battery power signal for each battery is calculated based on a product of a maximum power value of the power source and a ratio of one battery's state of discharge value over the sum of all battery's state of discharge values.

15. A method comprising:
    measuring each battery voltage value of a plurality of batteries connected to a single power source via independent electrical buses;
    measuring each battery current value of the plurality of batteries;
    generating a battery error signal for each battery of the plurality of batteries by the determining a difference between each battery voltage value and a reference voltage value;

determining if the sum of all battery error signals for the plurality of batteries is greater than a maximum power value of a power source used to charge the plurality of batteries;

generating a reference control signal for each battery of the plurality of batteries based on determining if the sum of all battery error signals for the plurality of batteries is greater than the maximum power value of the power source used to charge the plurality of batteries; and controlling the power output from the power source to each battery of the plurality of batteries based on the reference control signal.

16. The method according to claim 15, wherein generating the reference control signal for each battery of the plurality of batteries based on determining if the sum of all battery error signals for the plurality of batteries is greater than the maximum power value of the power source used to charge the plurality of batteries further comprises:

calculating a state of charge value for each battery based on the measured battery voltage value for each battery and the measured battery current value for each battery.

17. The method according to claim 16, further comprising:
adjusting the state of charge value for a battery capacity fade value.

18. The method according to claim 17, further comprising:
calculating a state of discharge value for each battery equal to 1 less than the adjusted state of charge value.

19. The method according to claim 18, further comprising:
calculating the reference control signal for one battery of the plurality of batteries based on a product of a maximum power value of the power source and a ratio of one battery's state of discharge value over a sum of all the plurality of battery's state of discharge values.

20. The method according to claim 19, wherein the controlling the power output from the power source to each battery of the plurality of batteries based on the reference control signal includes controlling a DC/DC converter for each battery of the plurality of batteries with a battery specific converted control signal to appropriate power from the power source to each of the plurality of batteries via the independent electrical buses.

* * * * *